United States Patent [19]
Daussan et al.

[11] Patent Number: 5,366,209
[45] Date of Patent: Nov. 22, 1994

[54] FILTER FOR MOLTEN METAL

[75] Inventors: Gérard Daussan; André Daussan, both of Longeville-les-Metz; Jean-Charles Daussan, Metz, all of France

[73] Assignee: Daussan & Compagnie, Woippy, France

[21] Appl. No.: 70,873

[22] Filed: Jun. 3, 1993

[51] Int. Cl.⁵ .............................. C22B 9/02
[52] U.S. Cl. ...................... 266/227; 75/412
[58] Field of Search ............ 266/227, 229, 230; 75/407–412; 210/226, 227

[56] References Cited
U.S. PATENT DOCUMENTS 3,907,962  9/1975  Ogiso .................... 75/412
4,358,375  11/1982  Wood .

FOREIGN PATENT DOCUMENTS 234979   9/1987  European Pat. Off. .
2255014  7/1975  France .
2199479  4/1979  France .
2419073  10/1979 France .
2593077  7/1987  France .
1152505  5/1969  United Kingdom .

Primary Examiner—Melvyn J. Andrews
Attorney, Agent, or Firm—Young & Thompson

[57] ABSTRACT

A filter for molten metal comprises a series of at least two refractory material plates in contact with each other at their periphery and defining between them one or more cavities. Each plate comprises a series of holes through which the molten metal passes and by which the molten metal is filtered. The cavities are at least in part filled with a filter material resistant to the temperature of the molten metal to be filtered and providing additional filtering of the metal. The filter material is based on fibers resistant to the temperature of the molten metal. The filter is used to filter molten metals.

13 Claims, 1 Drawing Sheet

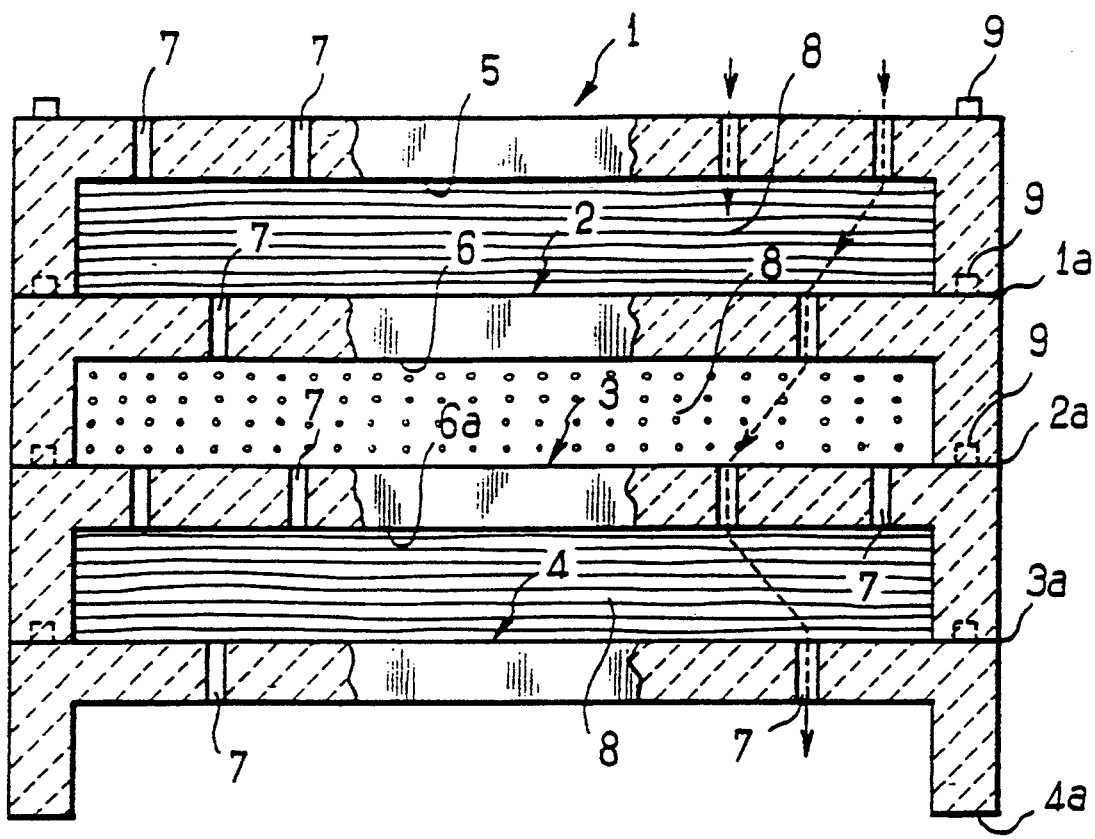
FIG_1
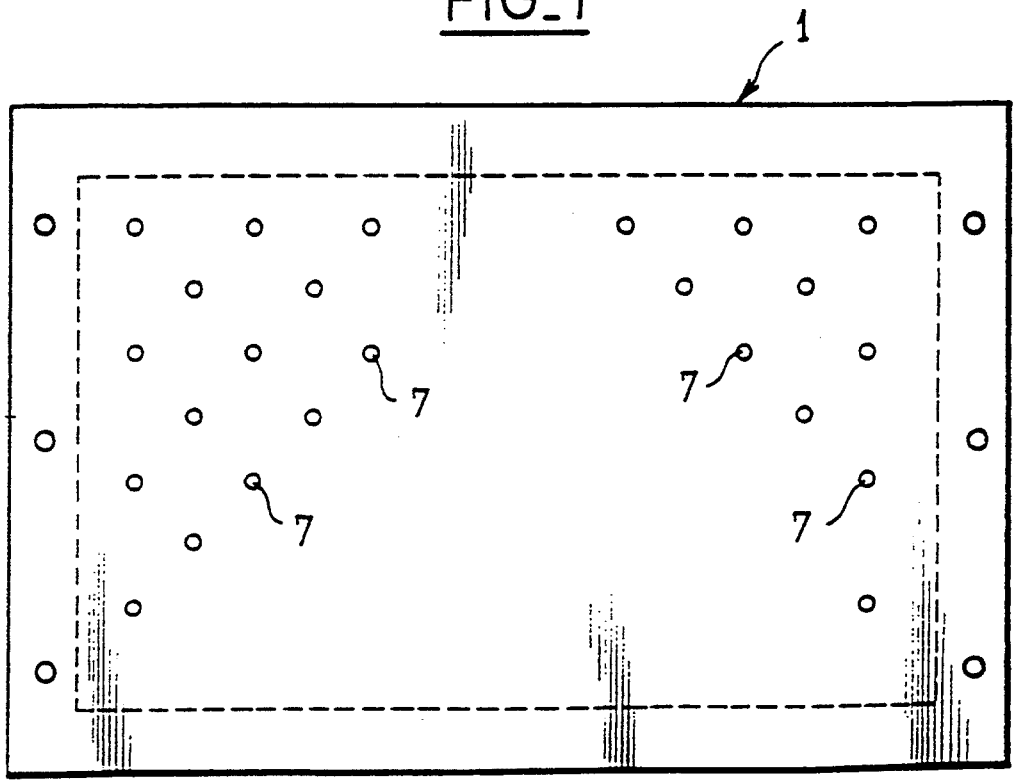
FIG_2

FILTER FOR MOLTEN METAL

BACKGROUND OF THE INVENTION

1. Field of the Invention

The present invention concerns a filter for molten metal comprising at least two refractory material plates in contact with each other at their periphery, defining between them one or more cavities and each comprising a series of holes through which the liquid metal passes and by which the liquid metal is filtered.

2. Description of the Prior Art

A filter of this kind is described in French patent 2 593 077.

A filter of this kind can eliminate from the molten metal any solid inclusions such as metal oxides likely to affect the quality of the metal which is cast into a container such as a mold.

The effectiveness of a filter of this kind depends essentially on the diameter of the holes and the number of plates constituting it. The smaller the diameter of the holes the greater the ability of the filter to hold back fine inclusions and the more effective the filter action.

However, it is virtually impossible to carry out filtration using plates in which the holes are less than 1 mm in diameter.

Holes this size are difficult to make in a refractory or ceramic material such as cast alumina, for example.

Also, if the holes have a diameter less than 1 mm filtration takes a very long time (because the molten metal passes through holes this size with difficulty) and the holes quickly clog.

If the number of plates is increased the cost of the filter is increased.

It is known to place inside the aforementioned cavities a particulate filter material whose particles are larger than the diameter of the holes in the plate, at least in the case of the particles near a plate. The particles cannot pass through the holes and interstices are defined between them through which the molten metal to be filtered passes.

The above remarks concerning the diameter of the holes in the plates apply equally to the interstices between the particles.

An object of the present invention is to remedy the drawbacks of the above filters to create a more effective but economic filter.

SUMMARY OF THE INVENTION

The invention consists in a filter for molten metal comprising a series of at least two refractory material plates in contact with each other at their periphery and defining between them one or more cavities, wherein said plates each comprise a series of holes through which said molten metal passes and by which said molten metal is filtered, said cavities are at least in part filled with a filter material resistant to the temperature of the molten metal to be filtered and provide additional filtering of said metal and said filter material is based on fibers resistant to the temperature of said molten metal.

Fibrous material placed in the cavities formed between the plates can increase the effectiveness of filtration, in particular by blocking very small particles which are not blocked by the plates with the holes.

This means that the holes in the plates can have a diameter exceeding 1 mm so that they are easy to manufacture but incapable of filtering out fine inclusions.

Accordingly, in accordance with the invention the plates with holes have a preliminary filter function and act as a support to confine the fibers so as to define within the fibrous material a filter path which is particularly effective at blocking the smallest particles.

The filter effectiveness of the fibrous material mass between the plates with the holes may be explained as follows:

- very small passages are defined between the fibers and effectively block solid inclusions,
- this ability to block inclusions is enhanced by the fact that the path of the metal through the fibrous material is longer than that through the holes in the plates,
- the fibers block the particles by capillary effect,
- the fibers are fairly mobile relative to each other with the result that the metal passing through them causes them to move which produces a particularly beneficial self-clearing effect.

Other features and advantages of the invention will emerge from the following description given by way of non-limiting example with reference to the appended drawings.

BRIEF DESCRIPTION OF THE DRAWINGS

FIG. 1 is a view in longitudinal cross-section of a filter in accordance with the invention.

FIG. 2 As a plan view of the filter.

DETAILED DESCRIPTION OF THE INVENTION

In the embodiment shown in the appended figures the filter for molten metal comprises a series of plates 1, 2, 3, 4 made from a refractory material such as alumina in contact with each other at their periphery 1a, 2a, 3a and defining cavities 5, 6, 6a between them, the combinations of plates being interchangeable.

The plates 1, 2, 3, 4 each comprise a series of holes 7 through which the molten metal passes and by which the molten metal is filtered (see arrows in FIG. 1).

According to the invention, the cavities 5, 6, 6a are at least partly filled with a material made up of fibers 8 resistant to the temperature of the metal to be filtered and providing further filtering of the metal.

In the example shown the fibrous material 8 is made up of fibers that are not bonded together and extend parallel to said plates, either lengthwise or widthwise. The direction of the fibers 8 may be interchanged from one cavity to the other, as shown in FIG. 1.

The diameter of the fibers is typically in the order of 4 $\mu$m and greater. Fibers with smaller diameters than this are hazardous to health and excessively fragile and would form dust likely to clog the filter and pollute the metal.

The diameter of the holes 7 in the plates 1, 2, 3, 4 is preferably between 1 and 5 mm.

The holes 7 in any plate are preferably in a quincunx arrangement relative to the holes in the adjacent plate, as shown in FIG. 1.

The distance between the plates of each pair is preferably greater than 3 mm so that cavities can De formed between the plates having sufficient volume to receive several layers of fibers.

In the embodiments shown each plate 1, 2, 3, 4 comprises a peripheral rim 1a, 2a, 3a in contact with an adjoining plate and defining said cavity 5, 6, 6a with said adjoining plate. The rims 1a, 2a, 3a or 4a may be bonded to the adjoining plates by means of a binder resistant to the temperatures encountered, the order in which the plates are combined being interchangeable. To facilitate centering of the plates 1, 2, 3, 4 relative to each other their periphery advantageously comprises at least two bosses 9 engaging in complementary recesses.

The mineral fibers may be chosen from, for example: rockwool, basalt, glass, blast furnace scoria and ceramic fibers such as alumina or silica-alumina fibers.

The fibrous material may instead comprise woven fibers with the weave permeable to the liquid metal or be in the form of a sponge made up of spongy materials and/or fibers or filaments, granules, grains or mixtures thereof in metal or mineral materials coated with materials resistant to the temperature of the cast metal.

In the case of filtering a metal having a low melting point, such as aluminum, the fibers may instead be made from-a metal having a melting point higher than that of aluminum such as fibers or a woven fabric of stainless steel.

During filtration the metal follows the path shown by the dashed line arrows in FIG. 1.

The fibers 8 in the cavities 5, 6, 6a significantly increase the filtering capability of the filter. In particular the mass of fibers 8 blocks solid particles significantly smaller than the holes 7. The holes 7 thus provide a coarse preliminary filter to block the larger particles.

The mass of fibers between the plates 1, 2, 3 may be replaced periodically.

However, the entire filter is preferably discarded after each filtration and replaced with a new filter.

The filtering capability of the filter in accordance with the invention is also dependent on the more or less compacted state of the fibrous mass or of the layers of woven fabric between the plates.

Thus to obtain very fine filtration relatively highly compressed masses of fibers 8 are used between the plates 1, 2, 3. However, if filtration does not need to be so fine the mass of fibers 8 may be relatively loosely packed and even occupy only part of the height of the cavities 5, 6, 6a between the plates.

To facilitate insertion of the fibrous mass 8 into the cavities 5, 6, 6a it is preferably preformed, in other words cut beforehand so that it is a fairly exact fit to the size of the cavity. The ratio between the initial thickness of the fibrous mass 8 and the height of the cavities determines how compressed the fibrous mass is between the plates.

Of course, the invention is not limited to the embodiments just described and numerous modifications may be made thereto without departing from the scope of the invention.

The number of plates may be reduced to two. In this case a single cavity filled with filter fibers or sponge is defined between the two plates.

There is claimed:

1. Filter for molten metal comprising a series of at least two refractory material plates in contact with each other at their periphery and defining between them one or more cavities, wherein said plates each comprise a series of holes through which said molten metal passes and by which said molten metal is filtered, said cavities are at least in part filled with a filter material resistant to the temperature of the molten metal to be filtered and provide additional filtering of said metal and said filter material is fibers resistant to the temperature of said molten metal that are not bonded together and which are parallel to said plates.

2. Filter according to claim 1 wherein the diameter of said fibers is in the order of 4 $\mu$m and greater.

3. Filter according to claim 1 wherein the diameter of said holes in said plates is between 1 and 5 mm.

4. Filter according to claim 1 wherein said holes in any of said plates are arranged in an offset arrangement relative to the holes in the adjoining plate.

5. Filter according to claim 1 wherein the distance between the plates of each pair is greater than 3 mm.

6. Filter according to claim 1 wherein each plate has a peripheral rim in contact with the adjoining plate and attached to the adjoining plate by means of a binder resistant to the temperatures encountered.

7. Filter according to claim 1 wherein said filter material comprises woven fibers and the weave is permeable to the liquid metal.

8. Filter according to claim 1 wherein said filter material is in the form of a sponge made up of refractory material filaments or fibers.

9. Filter according to claim 1 wherein said filter material incorporates a granular material resistant to the temperature of the molten metal to be filtered.

10. Filter according to claim 8 wherein said material is in the form of a sponge consisting of fibers, filaments, grains, granules or mixtures thereof in a metal and/or a mineral coated with a material resistant to the temperature of the cast metal.

11. Filter according to claim 1 wherein said fibers occupy substantially all the volume of said cavities.

12. Filter according to claim 1 wherein said fibers are compressed between said plates.

13. Filter according to claim 1 wherein there is a plurality of said cavities in superposed relationship, and the fibers in each said cavity are parallel to each other and disposed transversely to the fibers in each immediately adjacent said cavity.

* * * * *